(12) United States Patent
Chaney

(10) Patent No.: US 7,520,355 B2
(45) Date of Patent: *Apr. 21, 2009

(54) HYBRID ELECTRIC VEHICLE CHASSIS WITH REMOVABLE BATTERY MODULE

(76) Inventor: George T. Chaney, P.O. Box 710, Natalia, TX (US) 78059

( * ) Notice: Subject to any disclaimer, the term of this patent is extended or adjusted under 35 U.S.C. 154(b) by 616 days.

This patent is subject to a terminal disclaimer.

(21) Appl. No.: 11/206,988

(22) Filed: Aug. 18, 2005

(65) Prior Publication Data

US 2005/0274556 A1 Dec. 15, 2005

Related U.S. Application Data

(60) Continuation-in-part of application No. 10/645,025, filed on Aug. 21, 2003, now Pat. No. 7,201,384, which is a division of application No. 09/610,908, filed on Jul. 6, 2000, now Pat. No. 6,631,775.

(51) Int. Cl.
*B60R 16/04* (2006.01)
(52) U.S. Cl. ............... 180/68.5; 180/65.2; 280/783
(58) Field of Classification Search ............... 180/65.1, 180/68.5, 311, 312; 280/781, 783; 105/51; 320/104, 109, 112
See application file for complete search history.

(56) References Cited

U.S. PATENT DOCUMENTS

| 4,489,242 | A | * | 12/1984 | Worst | 307/10.1 |
| 5,141,173 | A | * | 8/1992 | Lay | 244/2 |
| 5,680,907 | A | * | 10/1997 | Weihe | 180/2.2 |
| 6,059,058 | A | * | 5/2000 | Dower | 180/65.3 |

* cited by examiner

*Primary Examiner*—Christopher P Ellis
*Assistant Examiner*—Bridget Avery
(74) *Attorney, Agent, or Firm*—Christopher L. Makay

(57) ABSTRACT

A hybrid-electric powered vehicle includes a chassis defining a battery module compartment and a battery module insertable into the battery module compartment. The hybrid-electric powered vehicle includes provisions for recharging a battery module compartment of the hybrid-electric powered vehicle when the electric drive system is operated. The battery module may further be charged by external sources while the battery module is disposed within the chassis, removed from the chassis, and by internal sources when the hybrid-electric powered vehicle is decelerating. In a second embodiment, the hybrid-electric powered vehicle further includes an on-board battery compartment, and a control system that regulates the distribution of power from the electrical power sources to the electric motor. The control system may utilize either the battery module or the on-board battery compartment, or the control system may place the two electrical power sources in series or in parallel, as required to meet electrical power demands.

40 Claims, 12 Drawing Sheets

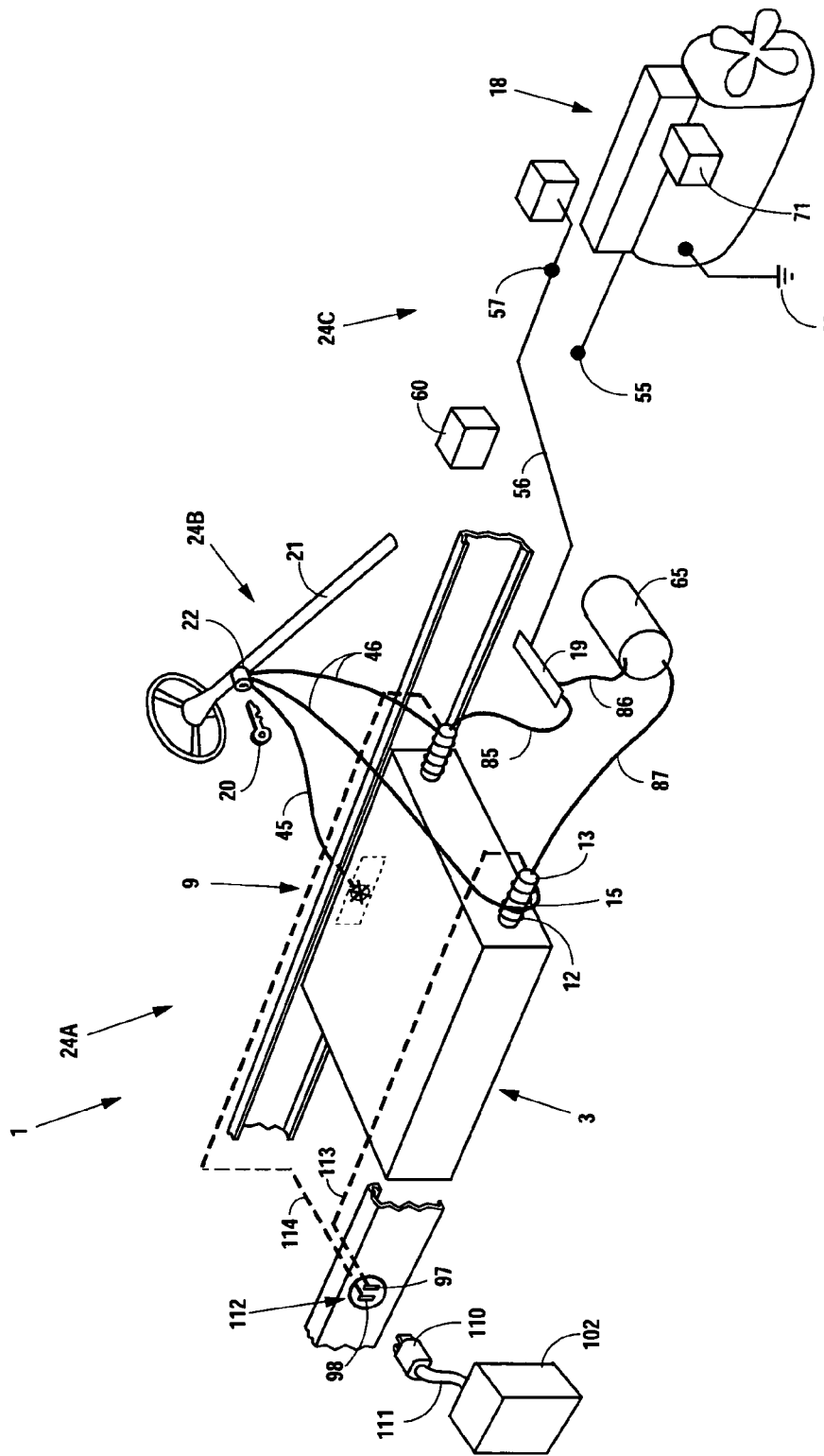
Fig. 8α

HYBRID ELECTRIC VEHICLE CHASSIS WITH REMOVABLE BATTERY MODULE

CROSS-REFERENCE TO RELATED APPLICATIONS

This application is a continuation-in-part of application Ser. No. 10/645,025, filed Aug. 21, 2003, now U.S. Pat. No. 7,201,384 which was a divisional of Ser. No. 09/610,908, filed Jul. 6, 2000, now U.S. Pat. No. 6,631,775 B1, issued Oct. 14, 2003.

BACKGROUND OF THE INVENTION

1. Field of the Invention

The present invention relates to hybrid-electric powered vehicles, and, more particularly, but not by way of limitation, to a hybrid-electric powered vehicle chassis having a removable battery module.

2. Description of the Related Art

Electrical powered vehicles have been available for many years but have never been widely accepted for use due to their limited range, however, hybrid-electric powered vehicles have been gaining popularity. A hybrid-electric powered vehicle typically includes an internal combustion engine, as well as an electric motor and drive train supported on a frame and enclosed in a body. In addition to the hardware required to house and operate the internal combustion engine, a battery or bank of batteries must also be supported on the frame and connect to the electric motor to provide power thereto. Often, the battery or bank of batteries requires a separate compartment and mounting assembly, which greatly increases vehicle weight and, thus, limits vehicle performance and vehicle range. The battery or bank of batteries is not normally removable from the vehicle.

Accordingly, there is a long felt need for a hybrid-electric powered vehicle design that integrates a removable battery pack in an existing vehicle structure, thereby reducing the excess weight that limits vehicle performance and operational range.

SUMMARY OF THE INVENTION

In accordance with the present invention, a hybrid-electric powered vehicle includes a chassis defining a battery module compartment and a battery module insertable into the battery module compartment of the chassis. The hybrid-electric powered vehicle further includes an access door coupled to the chassis, wherein the access door pivots from a closed position over the battery module compartment to an open position exposing the battery module compartment. The battery module includes a battery tray having an ignition contact to provide an electrical connection between the battery tray and an ignition system of the hybrid-electric powered vehicle and a battery insertable into the battery tray. The battery includes an ignition contact to provide an electrical connection between the battery and the battery tray.

The hybrid-electric powered vehicle further includes a locking assembly for locking the battery module within the battery module compartment of the chassis. The locking assembly includes a bolt residing within a cavity in the chassis, a biasing member for biasing the bolt to an unlocked position, and an electromagnetic field generator for generating an electromagnetic field that draws the bolt to a locked position within a cavity in the battery module. The locking assembly further includes a power contact engaged by the bolt in its locked position to provide an electrical connection among a battery of the battery module, the bolt, and an electric motor of the hybrid-electric powered vehicle. The locking assembly still further includes an ignition contact engaged by the electromagnetic field generator to provide an electrical connection among a battery of the battery module, the electromagnetic field generator, and an ignition system of the hybrid-electric powered vehicle.

The chassis includes a chassis front having a cross-member defining a front portion of the battery module compartment and a chassis rear having a cross-member defining a rear portion of the battery module compartment. The chassis front, the chassis rear, and a body of the hybrid-electric vehicle may be formed integrally in a unibody construction, wherein a section of the body spanning the chassis front and the chassis rear defines a side portion of the battery module compartment. A chassis contact may be attached to the section of the body spanning the chassis front and the chassis rear to provide an electrical connection between a battery of the battery module and an ignition system of the hybrid-electric powered vehicle. Alternatively, the chassis contact may be attached to the chassis front to provide an electrical connection between a battery of the battery module and an ignition system of the hybrid-electric powered vehicle. The chassis may further include a support member attached between the chassis front and the chassis rear, wherein the support member defines a side portion of the battery module compartment. The chassis contact may be attached to the support member to provide an electrical connection between a battery of the battery module and an ignition system of the hybrid-electric powered vehicle.

The removable battery module may be charged while disposed within the chassis by independent on-board power sources, external power sources, and through regenerative braking during deceleration of the hybrid-electric powered vehicle. The removable battery module may further be charged when removed from the hybrid-electric powered vehicle.

In a second embodiment, the hybrid-electric powered vehicle further includes an on-board battery compartment and a control system that regulates the delivery of power from the electrical power sources to the electric motor. The control system delivers electrical power from either the removable battery module or the on-board battery compartment, or the control system places the removable battery module and the on-board battery compartment in series or parallel, depending on electrical power demands. The ability to place the two power sources in series provides an increased power output, and the ability to place the two power source in parallel provides an increased current output. The control system may move from one state to another as required to deliver power at required thresholds. The on-board battery compartment may further be charged by all suitable means disclosed in the first embodiment.

It is therefore an object of the present invention to provide a chassis defining a battery module compartment that receives a battery module therein as an integral part, thereby reducing vehicle weight and increasing vehicle range.

It is another object of the present invention to provide a battery module that easily slides into and out from the battery module compartment.

It is a further object of the present invention to provide a locking mechanism that maintains the battery module within the battery module compartment.

It is still further an object of the present invention to provide a hybrid-electric powered vehicle including at least two electrical power sources and a control system, wherein the control system regulates the delivery of electrical power to the electric motor.

It is still yet further an object of the present invention to utilize the electrical power sources in series, parallel, or individually, as required to meet power requirements of the hybrid-electric powered vehicle.

Still other objects, features, and advantages of the present invention will become evident to those of ordinary skill in the art in light of the following.

BRIEF DESCRIPTION OF THE DRAWINGS

FIG. 8a is a detail view illustrating a power supply system of the hybrid-electric powered vehicle.

DETAILED DESCRIPTION OF THE PREFERRED EMBODIMENTS

Figure 1:
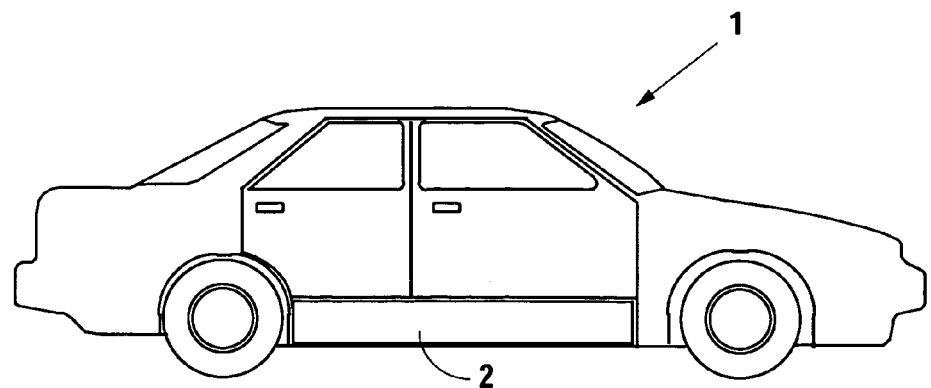
FIG. 1 is a side view illustrating a hybrid-electric powered vehicle including an access door to a battery module compartment.

As illustrated in FIGS. 1-4, and 8a, a hybrid-electric powered vehicle 1 includes a chassis 5 defining a battery module compartment 25 for receiving a battery module 3 therein. The hybrid-electric powered vehicle 1 further includes an access door 2 attached to the chassis 5 to provide access to the battery module compartment 25. In addition to the chassis 5, the battery module 3, and the access door 2, the hybrid-electric powered vehicle 1 includes components well known to those of ordinary skill in the art. Illustratively, the hybrid-electric powered vehicle 1 includes an internal combustion engine 18, a generator 71, an electric motor 65, a drive train including a transmission, wheels, a body, a suspension system, a braking system, a steering system, seats, interior amenities, and the like. The hybrid-electric powered vehicle 1 may include a battery employed as part of the ignition system for the internal combustion engine 18. Alternatively, the battery module 3 may supply power to the ignition system for the internal combustion engine 18. The foregoing components mount to the chassis 5 and connect together in a manner well known to those of ordinary skill in the art to form the hybrid-electric powered vehicle 1 that is capable of running on electric power or gasoline power, or a combination of both. While one electric motor 65 is shown, one of ordinary skill in the art will recognize that multiple electric motors may be utilized to propel the vehicle.

Figure 2:
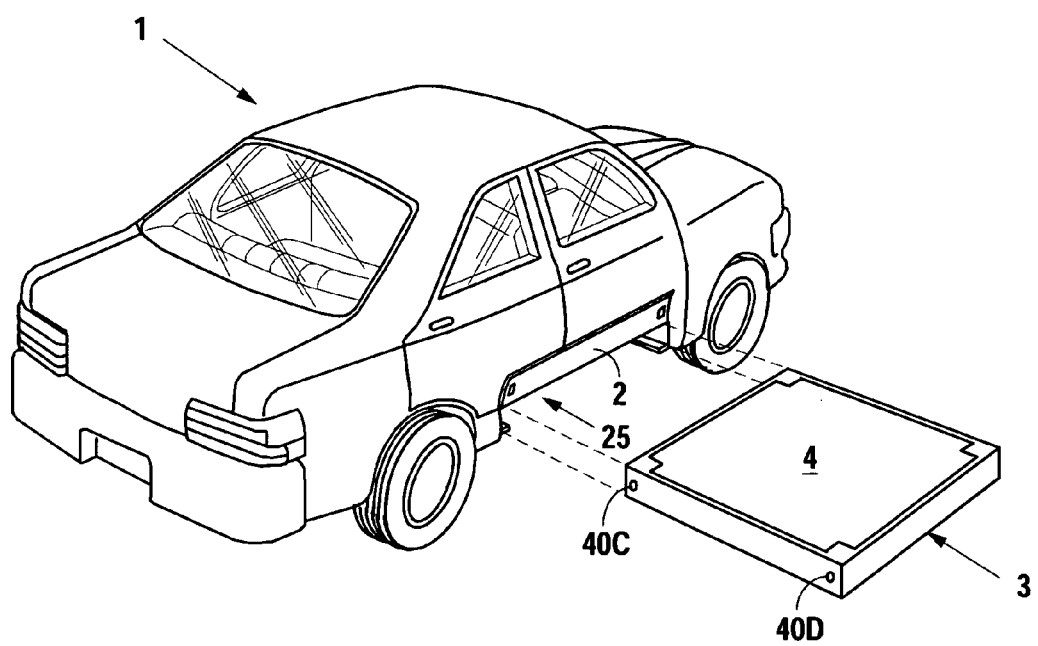
FIG. 2 is a perspective view illustrating the hybrid-electric powered vehicle with a battery module removed.
Figure 3:
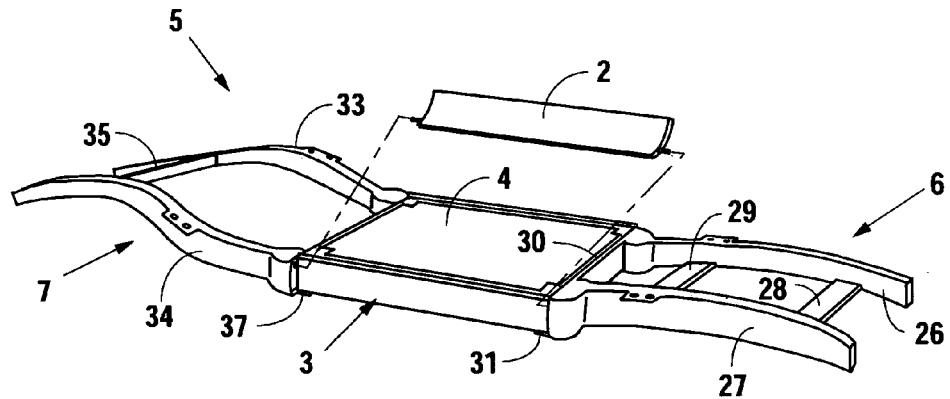
FIG. 3 is a perspective view illustrating a chassis of the hybrid-electric powered vehicle including the battery module inserted therein.
Figure 4:
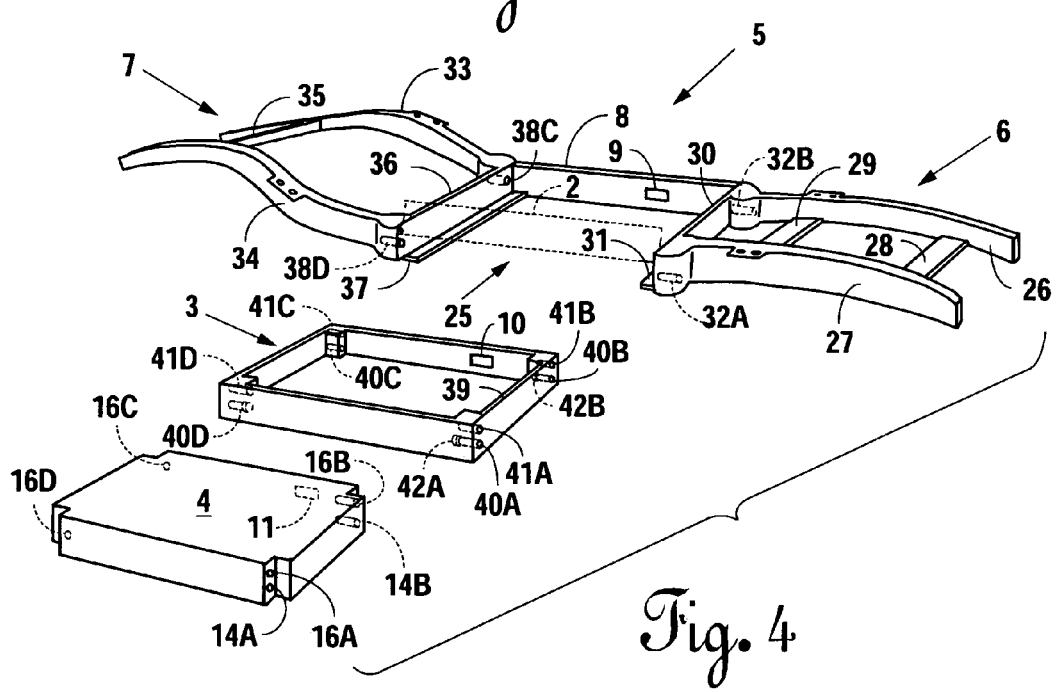
FIG. 4 is an exploded perspective view illustrating the chassis and the battery module.

As illustrated in FIGS. 2-4, the chassis 5 in both embodiments includes a chassis front 6, a chassis rear 7, and a support member 8. The chassis front 6 includes forks 26 and 27 spaced apart an appropriate distance and connected by crossbars 28 and 29 using any suitable means, such as welding. The crossbars 28 and 29 are spaced at appropriate intervals along the forks 26 and 27 to provide stability and support. A cross-member 30 attaches between the forks 26 and 27 at an interior end, using any suitable means, such as welding. The cross-member 30 defines a front portion of the battery module compartment 25 and includes a support ledge 31 for receiving and supporting the battery module 3 thereon. The forks 26 and 27 include a cylindrical cavity 32A and 32B, respectively, at an interior end, which forms part of a locking assembly 12 (described herein with reference to FIG. 5).

The chassis rear 7 includes forks 33 and 34 spaced apart an appropriate distance and connected by a crossbar 35 using any suitable means, such as welding, to provide stability and support. A cross-member 36 attaches between the forks 33 and 34 at an interior end, using any suitable means, such as welding. The cross-member 36 defines a rear portion of the battery module compartment 25 and includes a support ledge 37 for receiving and supporting the battery module 3 thereon. The forks 33 and 34 include a cylindrical cavity 38A and 38B, respectively, at an interior end, which forms part of the locking assembly 12 (described herein with reference to FIG. 5).

The support member 8 attaches at an interior side end of the chassis front 6 and the chassis rear 7 using any suitable means, such as welding, to couple the chassis front 6 and chassis rear 7 together, thereby providing stability and support. The support member 8 further defines a side portion of the battery module compartment 25 to facilitate proper positioning of the battery module 3 within the battery module compartment 25. A chassis contact 9 attaches at an interior face of the support member 8 to aid in the delivery of power to the locking assembly 12.

The access door 2 pivotally connects at an interior side end of the chassis front 6 and the chassis rear 7 opposite to the support member 8 using any suitable means, such as pins inserted within a cavity. The access door 2 is movable from a closed position to an open position. In the closed position, the access door 2 seals the battery module compartment 25 to lock the battery module 3 within the chassis 5, thereby preventing dislodgment or unwanted removal of the battery module 3 from the chassis 5. In the open position, the access door 2 exposes the battery module compartment 25 to permit access to the battery module 3 for replacement. It should be understood that, in the closed position, the access door 2 would be maintained shut using any suitable latching mechanism. Furthermore, the access door 2 may include a suitable locking mechanism operable only by a vehicle owner or authorized service technician to prevent the theft of the battery module 3. Although the access door 2 opens upwards and attaches to the chassis 5, those of ordinary skill in the art will recognize that the access door 2 may open downwards as well as connect to the hybrid-electric powered vehicle 1 at other suitable locations, such as the body.

The battery module 3 includes a battery 4 and a battery tray 39 defining an enclosure for receiving the battery 4 therein. The battery tray 39 includes cylindrical cavities 40A-D at each end, which form part of a locking assembly 12 (described herein with reference to FIG. 5). The battery tray 39 further includes ignition contacts 10 and 41A-D, which aid in the delivery of power to the locking assembly 12 (described herein with reference to FIGS. 8 and 9). The battery tray 39 still further includes power contacts 42A and B at a front end, which aid in the delivery of power to the electric motor 65 (described herein with reference to FIGS. 8 and 9).

The battery 4 is a rechargeable battery, such as a nickel-zinc battery, a lithium ion battery, or a battery employing nanotechnology, well known to those of ordinary skill in the art. The battery 4 fits within the battery tray 39 and is held therein either through a friction fit or a suitable securing mechanism, such as a clamp, strap, or the like. The battery 4 includes ignition contacts 11 and 16A-D, which engage the ignition contacts 10 and 41A-D of the battery tray 39 to permit the delivery of power from the battery 4 to the locking assembly 12. The battery 4 further includes power contacts 14A and B at a front end, which engage the power contacts 42A and B of the battery tray 39 to aid in the delivery of power from the battery 4 to the electric motor 65. Although only one battery 4 is disclosed, those of ordinary skill in the art will recognize that any number of batteries connected in series to produce the same results may be utilized.

Figure 5:
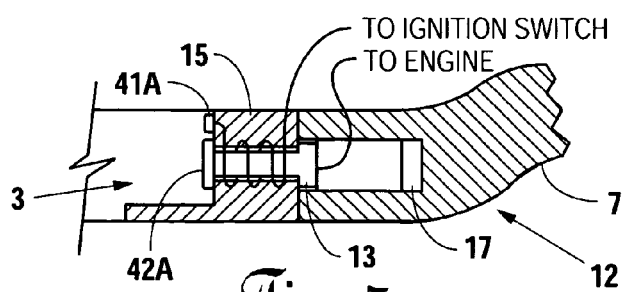
FIG. 5 is a cutout section view of the chassis illustrating a locking assembly.

As illustrated in FIG. 5, a locking assembly 12 includes a bolt 13 and a natural magnet 17, which reside in the cylindrical cavity 32A. The locking assembly 12 further includes a coil 15, an ignition contact 41A connected to the coil 15, and a power contact 42A engaged with the cylindrical cavity 40A. For the purposes of disclosure, only a locking assembly 12 associated with cylindrical cavities 32A and 40A will be described because the locking assembly 12 associated with the cylindrical cavities 32B and 40B is identical. Furthermore, the locking assemblies 12 associated with the cylindrical cavities 38C and 40C and with the cylindrical cavities 38D and 40D are identical, except those locking assemblies do not include a power contact as they merely lock the battery module to the rear chassis 7 and do not aid in the delivery of power from the battery 4 to the electric motor 65.

The natural magnet 17 attaches at the rear of the cylindrical cavity 32A using any suitable means, and the coil 15 resides within the battery tray 39 in a position encircling the cylindrical cavity 40A. The bolt 13 slides freely within the cylindrical cavity 32A from an unlocked to a locked position. When no power is applied to the locking assembly 12, the natural magnet 17 draws the bolt 13 away from the cylindrical cavity 40A and completely into the cylindrical cavity 32A, which is the unlocked position. In the unlocked position, the battery module 3 may be removed from the chassis 5, as the bolt 13 does not engage the battery tray 39. Although a natural magnet 17 is disclosed, those of ordinary skill in the art will recognize other suitable means for maintaining the bolt 13 in the unlocked position, such as a spring.

When power is applied to the locking assembly 12, the coil 15 energizes, creating an electromagnetic field that overcomes the magnetic field of the natural magnet 17, thereby drawing the bolt 13 into the cylindrical cavity 40A of the battery tray 39. The coil 15 draws the bolt 13 into the cylindrical cavity 40A until the bolt 13 engages the power contact 42A, which is the locked position. In the locked position, the battery module 3 cannot be removed from the chassis 5, as the bolt 13 engages the battery tray 39. Furthermore, the bolt 13 serves as a contact in the transfer of power from the battery 4 to the electric motor 65 (described herein with reference to FIG. 8a). Although the preferred embodiment discloses four locking assemblies, those of ordinary skill in the art will recognize that only one is necessary to maintain the battery module 3 within the chassis 5 and to aid in the delivery of power from the battery 4 to the electric motor 65.

As illustrated in FIGS. 2-5, a fully charged battery 4 is placed within a battery tray 39 to form a battery module 3. In placing the battery 4 into the battery tray 39, the ignition contacts 11 and 16A-D of the battery 4 engage the ignition contacts 10 and 41A-D of the battery tray 39, and the power contacts 14A and B of the battery 4 engage the power contacts 42A and B of the battery tray 39. The access door 2 is moved to its open position to expose the battery module compartment 25 and permit the removal of a depleted battery module 3. At this point, the locking assembly 12 is in its unlocked position due to the absence of power. The battery module 3 is positioned on the support ledges 31 and 37 of the cross-members 30 and 36 and slid into the battery module compartment 25 until the battery module 3 contacts and resides against the support member 8. With the battery module 3 positioned against the support member 8, the cylindrical cavities 32A and B and 38C and D align with a respective cylindrical cavity 40A-D. Furthermore, the ignition contact 10 resides completely through the battery tray 39 such that the ignition contact 10 engages the chassis contact 9 to form an electrical connection therebetween. After insertion of the battery module 3, the access door 2 is moved to its closed position to seal the battery module compartment 25, thereby preventing removal of the battery module 3. Upon the application of power as described herein with reference to FIG. 8a, the locking assembly 12 moves to its locked position to secure the battery module 3 within the battery module compartment 25.

The chassis 5 defines a battery module compartment 25 that receives a battery module 3 therein, which becomes part of the chassis 5, to solve the excessive weight problem associated with hybrid-electric powered vehicles. The chassis 5 includes a removed portion (i.e., the battery module compartment 25) so that the chassis 5 incorporates the battery module 3, thereby eliminating the necessity of a separate battery assembly. The battery module 3 completes the chassis 5, which provides the chassis 5 with the required structural integrity, while reducing the weight of the hybrid-electric powered vehicle 1 to a point where its performance and operational range significantly improves over hybrid-electric powered vehicles having separate battery assemblies.

Figure 6:
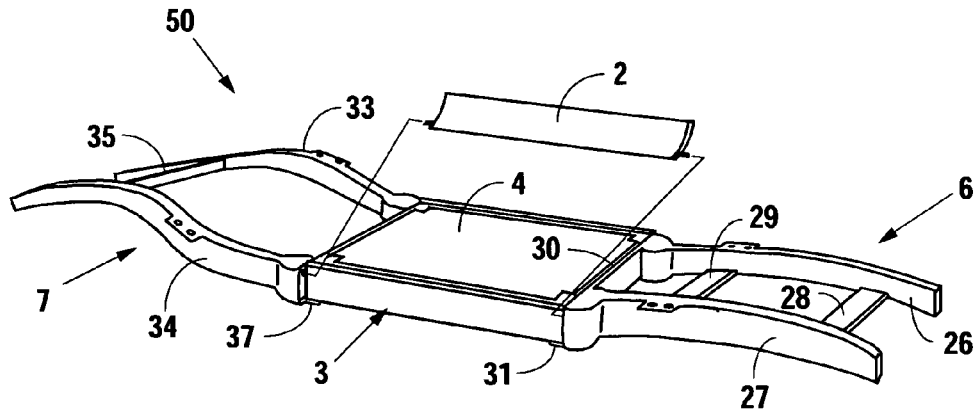
FIG. 6 is a perspective view illustrating an alternative chassis of the hybrid-electric powered vehicle including the battery module inserted therein.
Figure 7:
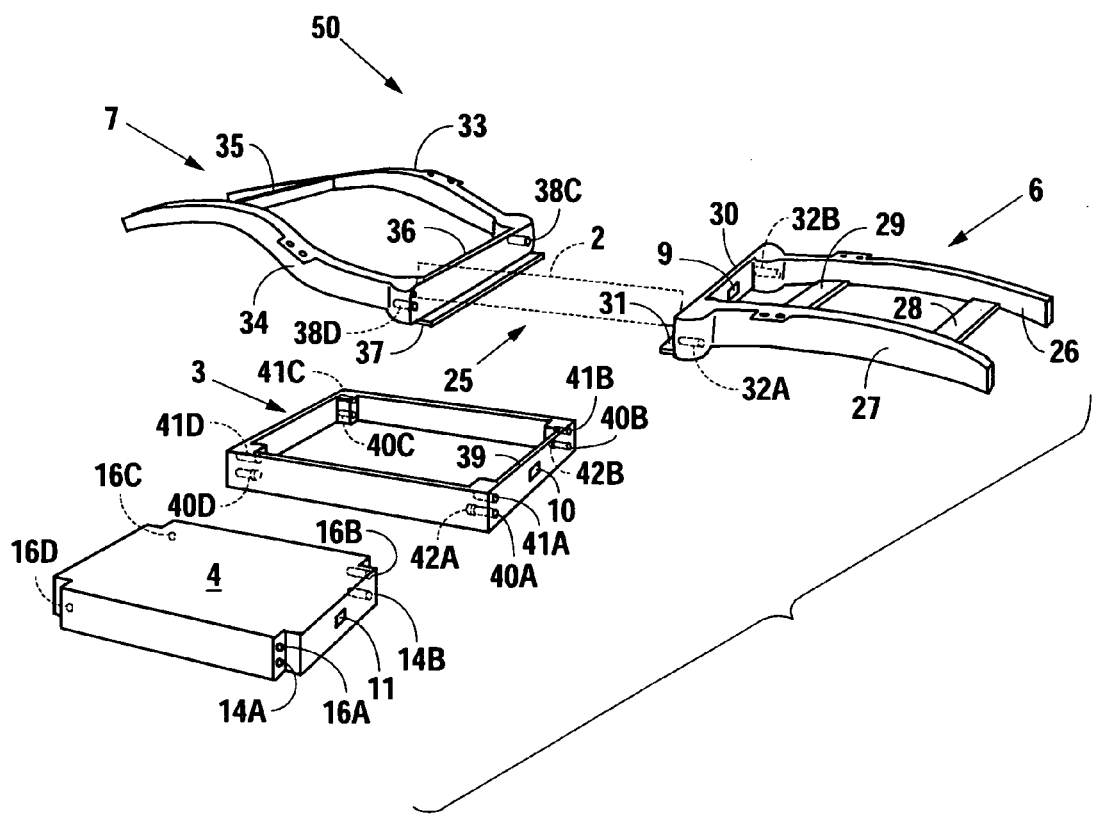
FIG. 7 is an exploded perspective view illustrating the alternative chassis and the battery module.

As illustrated in FIGS. 6 and 7, an alternative chassis 50 permits a unibody construction for the hybrid-electric powered vehicle 1. In a unibody construction for the hybrid-electric powered vehicle 1, the chassis 50 and the body of the hybrid-electric powered vehicle 1 are formed integrally as one piece, which eliminates the need for the support member 8. The chassis 50 is identical in design, construction, and operation to the chassis 5 and like parts have been identified with like numerals, except the support member 8 has been eliminated. With the removal of the support member 8, the section of the body spanning the chassis front 6 and the chassis rear 7 opposite to the access door 2 forms a side portion of the battery module compartment 25. The chassis contact 9 may be mounted to the body section in a position similar to the position on support member 8, or, alternatively, the chassis contact 9 may be relocated from the support member 8 onto the cross-member 30. If the chassis contact 9 is relocated, the ignition contact 10 is relocated from the side to the front of the battery tray 39, and the ignition contact 11 is relocated from the side to the front of the battery 4. Similar to the chassis 5, the ignition contact 11 of the battery 4 electrically connects with the ignition contact 10 of the battery tray 39, and, upon the insertion of the battery module 3 into the battery module compartment 25 until the battery module 3 abuts the sidewall of the battery compartment 25, the ignition contact 10 of the battery tray 39 electrically connects with the chassis contact 9.

The hybrid-electric powered vehicle 1, which includes a chassis 5 or 50 defining a battery module compartment 25 for receiving a battery module 3 that becomes integrated with the chassis 5 or 50, improves the effective range of the vehicle 1 by reducing vehicle weight. This increased effective range permits a service facility, whereby a customer entering a service facility with a depleted battery module 3 would have the depleted battery module 3 removed by a service technician and replaced with a battery module 3 including a fully charged battery 4. The service facility would include a plurality of battery modules 3, and a system for charging the battery modules 3. After removal, the depleted battery module 3 would be charged for use by another customer. Such a service would be similar to current gas stations, except, instead of paying for gas, the customer would pay a fee for the charged battery module 3, which, for example, could be based on the difference in charge between the depleted and charged battery modules 3 or simply be a flat rental type fee. Those of ordinary skill in the art will recognize that the hybrid-electric powered vehicle 1 would include a gauge, whereby the charge remaining on an installed battery module 3 would be communicated to a vehicle user.

Figure 8B:
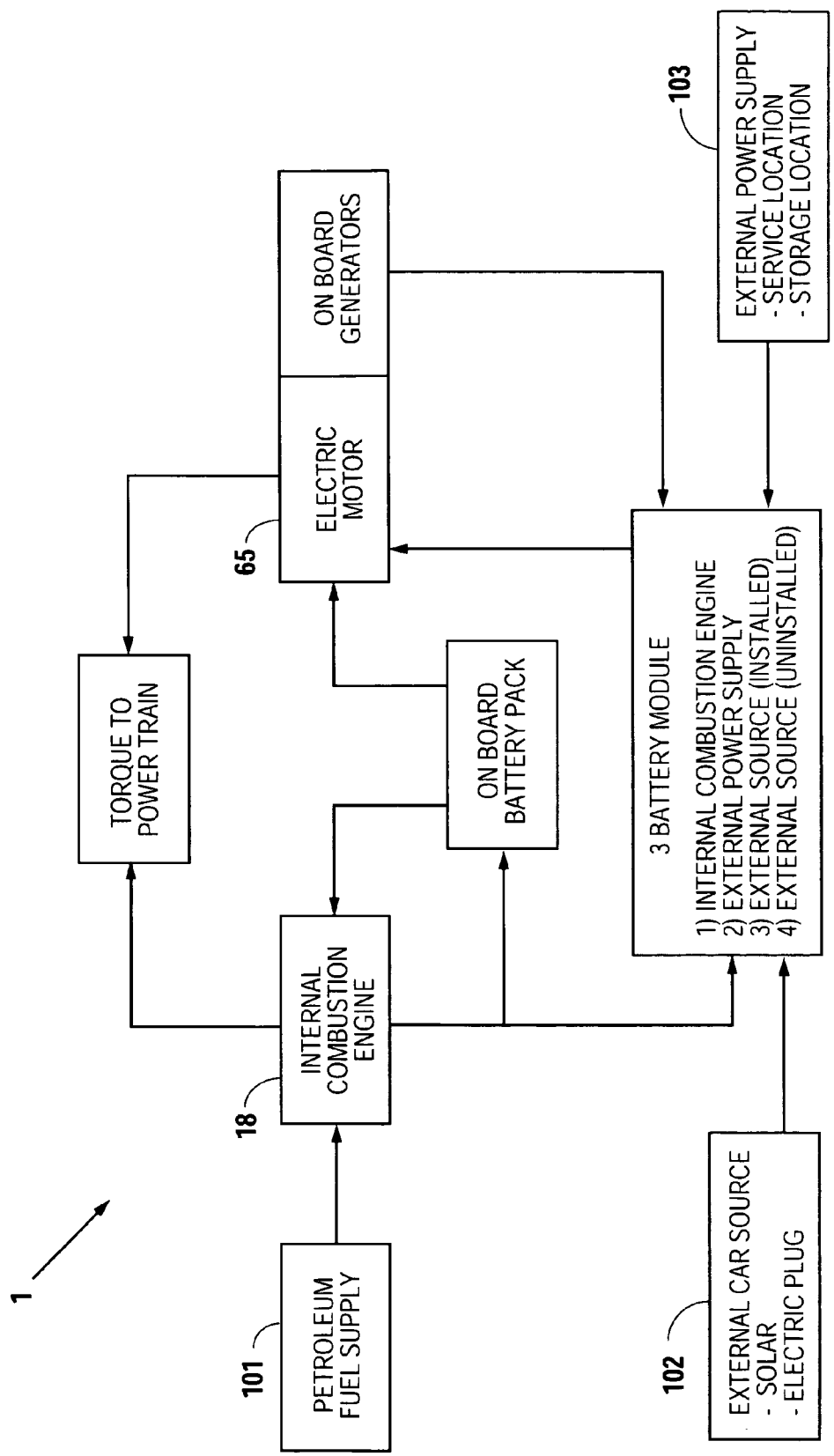
FIG. 8b is an operation flowchart illustrating a hybrid-electric powered vehicle system according to the preferred embodiment.

As illustrated in FIG. 8a, a detailed example of a hybrid-electric powered vehicle 1 includes an ignition system 24A, an electrical driving system 24B, an internal combustion driving system 24C, and a variable power transfer device 19, which, in this example, is an accelerator pedal that operates a variable resistor, a silicon controlled resistor (SCR), and the like. The hybrid-electric powered vehicle 1 may further include a control device 60 to regulate the sequencing operations between the electrical driving system 24B and the internal combustion driving system 24C. The ignition system 24A includes an ignition switch 22, which, in this preferred embodiment, is located on a steering column 21. The ignition switch 22 is electrically connected at an input side to the chassis contact 9 using any suitable means, such as a wire 45 run appropriately from the chassis 5 or 50 and along the steering column 21. The ignition switch 22 further connects at an output side to the coil 15 of a locking assembly 12 and to each coil of the remaining locking assemblies of the hybrid-electric powered vehicle 1 using any suitable means, such as a wire 46 run appropriately from the steering column 21 along the chassis 5 or 50. A key 20 moves the ignition switch 22 from an off position to an on position that permits the delivery of power from the battery 4 to the coil 15 of a locking assembly 12 and to each coil of the remaining locking assemblies of the hybrid-electric powered vehicle 1.

The electrical driving system 24B includes the electric motor 65, the battery module 3, a power transfer lead 85, a drive lead 86, and a battery lead 87. The power transfer lead 85 electrically connects the bolt 13 located at the front of the battery module 3 to the power transfer device 19 using any suitable means, such as a wire along the chassis 5 or 50. The drive lead 86 electrically connects the power transfer device 19 to the electric motor 65 using any suitable means, such as a wire along the chassis 5 or 50. The battery lead 87 electrically connects the electric motor 65 to a second bolt 13 also located at the front of the battery module 3 using any suitable means, such as a wire run along the chassis 5 or 50. The variable power transfer device 19 allows a vehicle operator to regulate the delivery of power from the battery 4 to the electric motors 65, and thus, vehicle speed. Connection of the leads 85, 86, and 87 in this manner places the motor 65 and the power distribution control 19 in series with the battery 4, when the coils 15 are energized.

The electric motor 65 may be any form torque transmission from an electrical source, including direct current motors, stepper motors, and the like. One of ordinary skill in the art will recognize that the type of motor selection may be dependent upon the intended application. In this hybrid-electric powered vehicle 1, a direct current motor is utilized for the output of torque. The electric motor 65 may be installed into the hybrid-electric powered vehicle 1 in a fashion that permits the use of the internal combustion engine 18, the electric motor 65, or a combination or sequence utilizing both. The hybrid-electric powered vehicle 1 may further include the control device 60 to regulate the sequencing operations between the electric driving system and the internal combustion driving system.

The internal combustion driving system 24C includes an internal combustion engine 18 and a generator 71. The internal combustion engine 18 is readily known in the art, and comprises an electrical power input 55 disposed at the engine 18, a grounding connection 58, and an accelerator input 57 for accepting an accelerator linkage 56. In this detailed example, the internal combustion engine 18 is fueled by gasoline, however, one of ordinary skill in the art will recognize that alternative fuels may be utilized, such as natural gas, propane, and the like. Fuel regulation and mixture controls may be accomplished using off the shelf carburetors or fuel injection systems. The application of the fuel to the internal combustion engine 18 may be directed by an operator through the use of the accelerator input 57, typically a ball joint mounted on a throttle plate. An accelerator linkage 56 may be connected to the ball joint and a power input device, such as a foot-activated accelerator in a passenger compartment of a vehicle. In this detailed example, the power distribution control 19 may be shared by both the electrical driving system 24B and the internal combustion driving system 24C. The electrical input 55 is electrically connected to the ignition switch 22, such that the internal combustion engine 18 receives power for operation from the battery module 3 when the ignition switch 22 is in an on position. The generator 71 is coupled to the internal combustion engine 18, and may deliver power to the battery module 3 when the internal combustion engine 18 is operating.

In operation, a vehicle operator places the key 20 into the ignition switch 22 and moves the ignition switch 22 to an on position that provides power from the battery 4 to the ignition system 24A. As a result, the coils 15 energize, thereby drawing a respective bolt into a respective cylindrical cavity 40A-D to lock the battery module 3 within the chassis 5 or 50. Furthermore, the bolts 13 associated with the driving system 24B engage a respective power contact 42A and B to electrically connect the battery module 3 in series with the electric motor 65. In the on position, the power transfer device 19 permits the application of power to the motor 65 when the accelerator is activated. Thus, engaging the variable power transfer device 19 (i.e., stepping on the accelerator pedal) furnishes power in increasing levels to the electric motor 65, and/or the internal combustion engine 18, causing movement of the hybrid-electric powered vehicle 1.

As power requirements are delivered to the power distribution control 19, power is applied to the electric motor 65 through the closed loop of the power transfer lead 85, the drive lead 86, and the battery lead 87. The battery 4 may provide all required electrical functions, including starting and propelling the hybrid-electric powered vehicle 1. In such cases, the electrical driving system 24B must be in electrical communication with the electrical power input 55 of the internal combustion engine 18. One of ordinary skill in the art will recognize that a generator 71 may be utilized in conjunction with the internal combustion engine 18 to generate an electric field while the internal combustion engine 18 is operating, and applying the electric filed to the internal combustion engine 18, as well as recharging the battery 4.

Figure 8C:
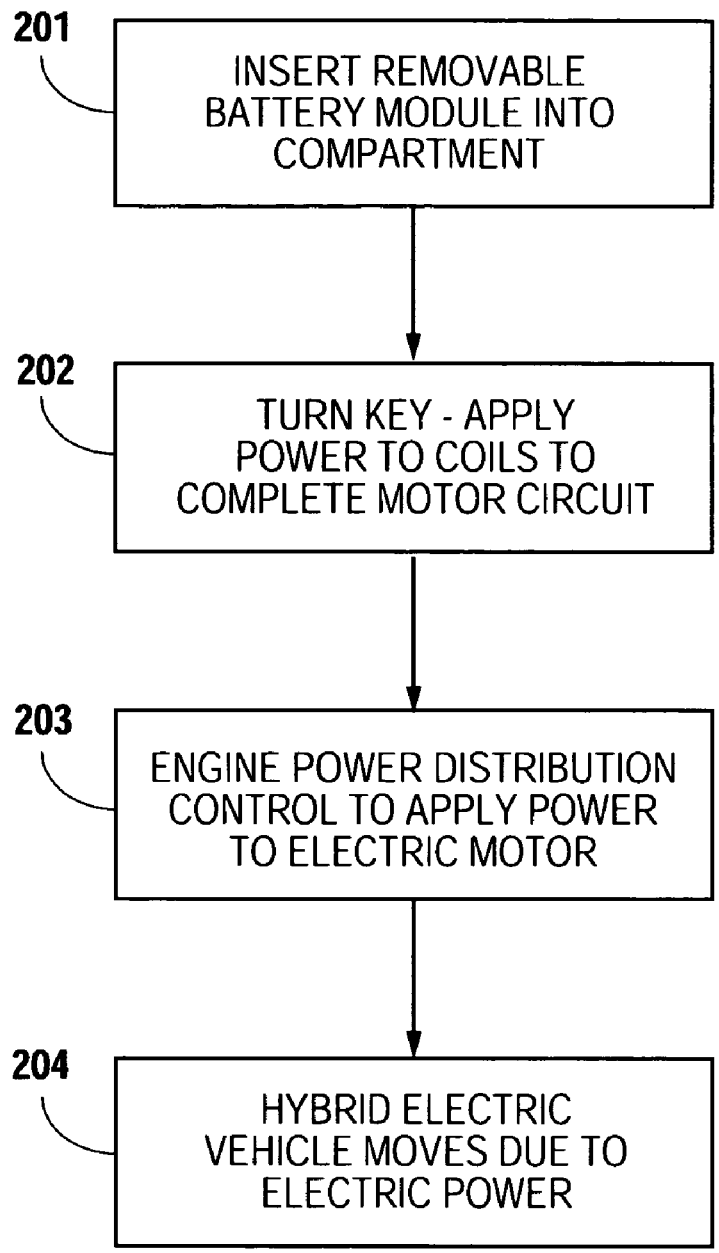
FIG. 8c provides a method flowchart for utilizing a battery module to propel the hybrid-electric powered vehicle.

FIG. 8c provides a flowchart illustrating a method of use for the removable battery module 3. As shown in step 201, a battery module 3 is inserted into the battery compartment 25. In the fully engaged position, the battery module 3 is electrically connected through the contact 9 and the ignition contact 10. An operator may then place the key 20 in the ignition switch 22 and turn the key 20 in the ignition switch 22 to apply power to the coils 15, thereby drawing the bolts 13 outward to complete a drive circuit that includes the removable battery module 3, step 202. An operator may then engage a power distribution control 19 to apply power to the electric motor 65, as shown in step 203. Upon the application of power to the electric motor 65, the hybrid-electric powered vehicle 1 is propelled, step 204.

When a vehicle operator uses the key 20 to move the ignition switch 22 to an off position, the coils 15 de-energize, resulting in the natural magnets drawing a respective bolt 13 into a respective cylindrical cavity 32A and B and 38C and D, thereby unlocking the battery module 3 and removing power from the electric motor 65. The hybrid-electric powered vehicle 1 of this second embodiment de-energizes the coils and breaks the circuit to isolate the battery 4, thereby providing maximum conservation of the battery 4. The internal combustion engine 18 is also disabled when the ignition switch 22 is in the off position, thereby ceasing the generation of power by the generator 71.

The hybrid-electric powered vehicle 1 may further include an electrical input 112 having a first terminal 97 and a second terminal 98. The electrical input 112 may be disposed at an accessible location, and suitably mounted to the chassis 5 or 50. The electrical input 112 may be any form of electrical connection device, including a plug, receptacle, harness, or the like, that may provide an accessible connection location for both external connections or connections for on-board power sources. In this detailed example, a first external recharge lead 113 is connected to the first terminal 97 and the bolt 13 of the removable battery module 3. A second external recharge lead 114 extends from the second terminal 98 of the electrical input 112 to the second bolt 13 of the removable battery module 4. Accordingly, the first terminal 97 and the second terminal 98 are in electrical communication with opposing poles of the removable battery module 4, thereby placing the electrical input 112 in parallel with the removable battery module 3. As such, any direct current applied to the terminals 97 and 98 may recharge the battery module 3.

The battery module 3 may further be charged by external power sources 102 while the battery module 3 is mounted in the battery module compartment 25. The external power source 102 may be virtually any form of power source connectable to the battery module 3, including on board charging devices or remote charging devices. As shown in FIG. 8a, an external power source 102 may be coupled to a remote power supply, such as a conditioned residential power distribution system, or a charging facility. The remote charging device may include a recharge lead 111 having leads compatible with the external recharge leads 113 and 114, and a connector 110 suitable for mating with the electrical input 112, whereby an electric current is transmitted from the remote charging device, through the terminals 97 and 98 of the electrical input 112, through the first and second external recharge leads 113 and 114, to the poles of the battery module 3. In use, an operator may connect the external power source 102 to the battery module 3 by plugging the connector 110 into the electrical input 112.

In the case of an on-board power supply, a similar connection scheme may be utilized to keep the independent systems separable. On-board power supplies may further remain installed in the hybrid-electric powered vehicle 1. Illustratively, the battery module 3 may be electrically coupled to an onboard solar device or a generator. One of ordinary skill in the art will recognize that it is advantageous to provide a charging capability to the battery module 3 while the battery module 3 remains mounted within a battery compartment of the hybrid-electric powered vehicle 1.

Figure 8D:
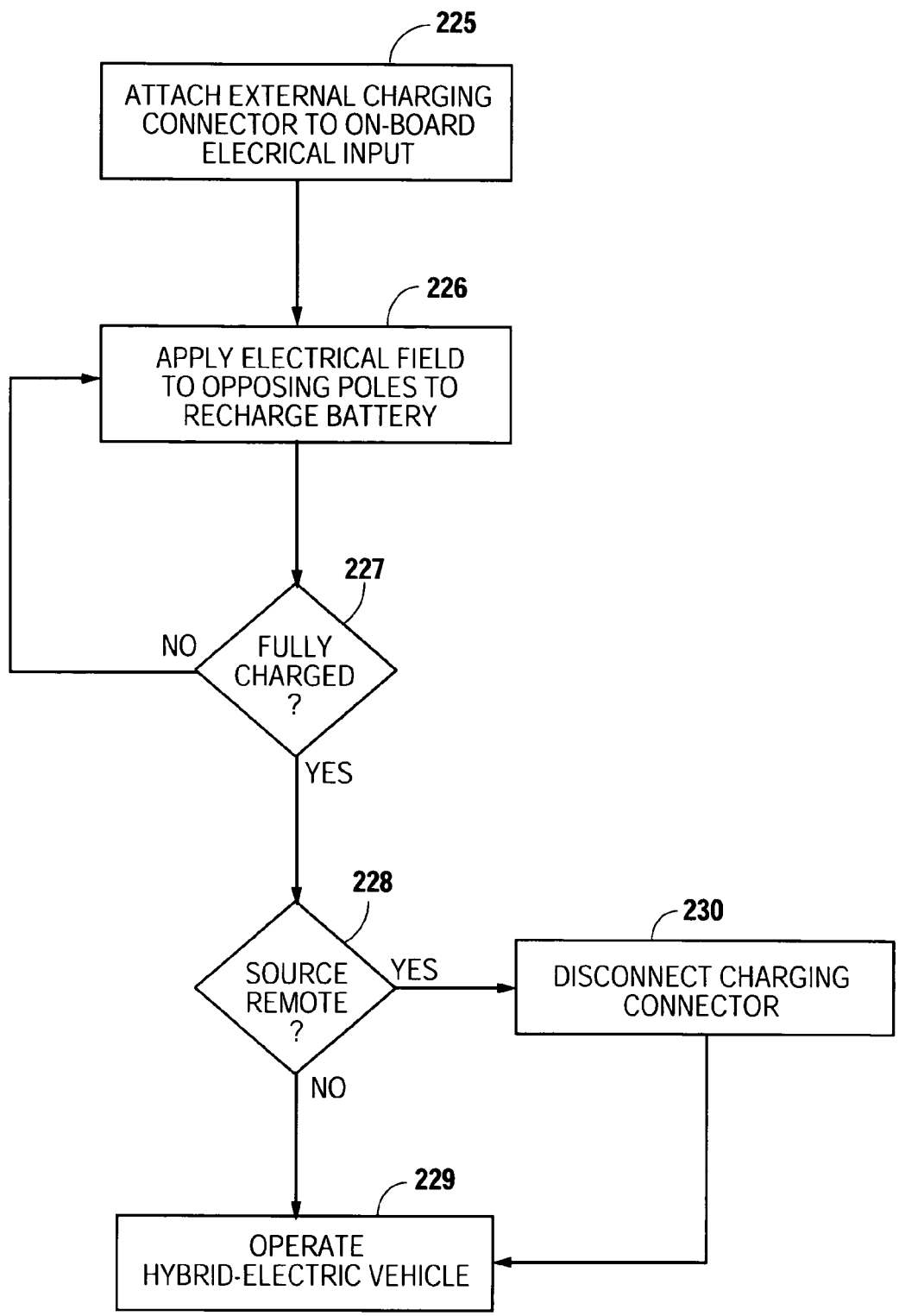
FIG. 8d provides a method flowchart illustrating on-board charging of the battery module according to the preferred embodiment.

As shown in the method flowchart of FIG. 8d, an operator may attach an external charging connector 110 to the on-board electrical input 112 with the battery module 3 remaining in the battery compartment 25, as shown in step 225. The operator may then apply an electric field compatible with the battery module 3 to recharge the battery 4, step 226. In step 227, the operator must determine if the battery module 3 is fully charged. If the battery module 3 is not fully charged in step 227, the process returns to step 226 to continue the application of a charging current to the battery module 3. If the battery module 3 is fully charged in step 227, the operator moves to step 228 for a determination of whether the source 102 is a remote source or an on board source. If the source 102 is a remote source, then the connector must be removed before utilizing the hybrid-electric powered vehicle 1, step 230. If the source 102 is an on-board source, then the hybrid-electric powered vehicle 1 is ready for use, step 229.

The hybrid-electric powered vehicle 1 may further include an additional battery electrically coupled to the internal combustion engine 18 for use as a starting device. One of ordinary skill in the art will recognize that twelve-volt batteries are normally placed into motor vehicles to provide starting power, as well as to provide energy for lights, alarms, and other control functions. The battery may be permanently secured utilizing conventional battery securing techniques. The battery may further be electrically coupled to an ignition system, such that electric power flows past an ignition switch to a starter on the internal combustion engine 18, thereby providing starting power when a battery module 3 is removed from the hybrid-electric powered vehicle 1. The battery may be charged by the generator 71 during engine 18 operation.

In the hybrid-electric powered vehicle 1, the battery module 3 is removable as previously disclosed. The battery module 3 may be electrically coupled to the electric motor 65 when the hybrid-electric powered vehicle 1 is operating. Upon the application of power to the electric motor 65, torque is transmitted to the power train, thereby propelling the hybrid-electric powered vehicle 1. The battery module 3 of the hybrid-electric powered vehicle 1 may be electrically coupled to the generator 71 of the internal combustion engine 18, such that the battery module 3 may receive a charging current when the internal combustion engine 18 is operating.

The battery module 3 may further be charged by the electric motor 65 which operates as an on-board generators when the battery module 3 is not applying power to the electric motor 65, and the electric motor 65 rotates due to the motion of the electric vehicle 1. As the electric motor 65 is permanently secured to the drive train, an engaged part of the electric motor 65 continues to move with gearing, thereby rotating a rotor within a stator of the electric motor 65, and generating an electric field. The generated electric field may then be applied to the battery module 3. One of ordinary skill in the art will recognize that this form of power generation is referred to as "regenerative braking." While the regenerative braking has been disclosed as being accomplished with the electric motor 65, it should clearly be evident that a separate regenerative braking device may be utilized in lieu of the electric motor 65, or in addition to the electric motor 65. Illustratively, multiple regenerative braking devices may be suitably mounted on the hybrid-electric powered vehicle 1, such that they generate current when rotated without the application of power.

Figure 8E:
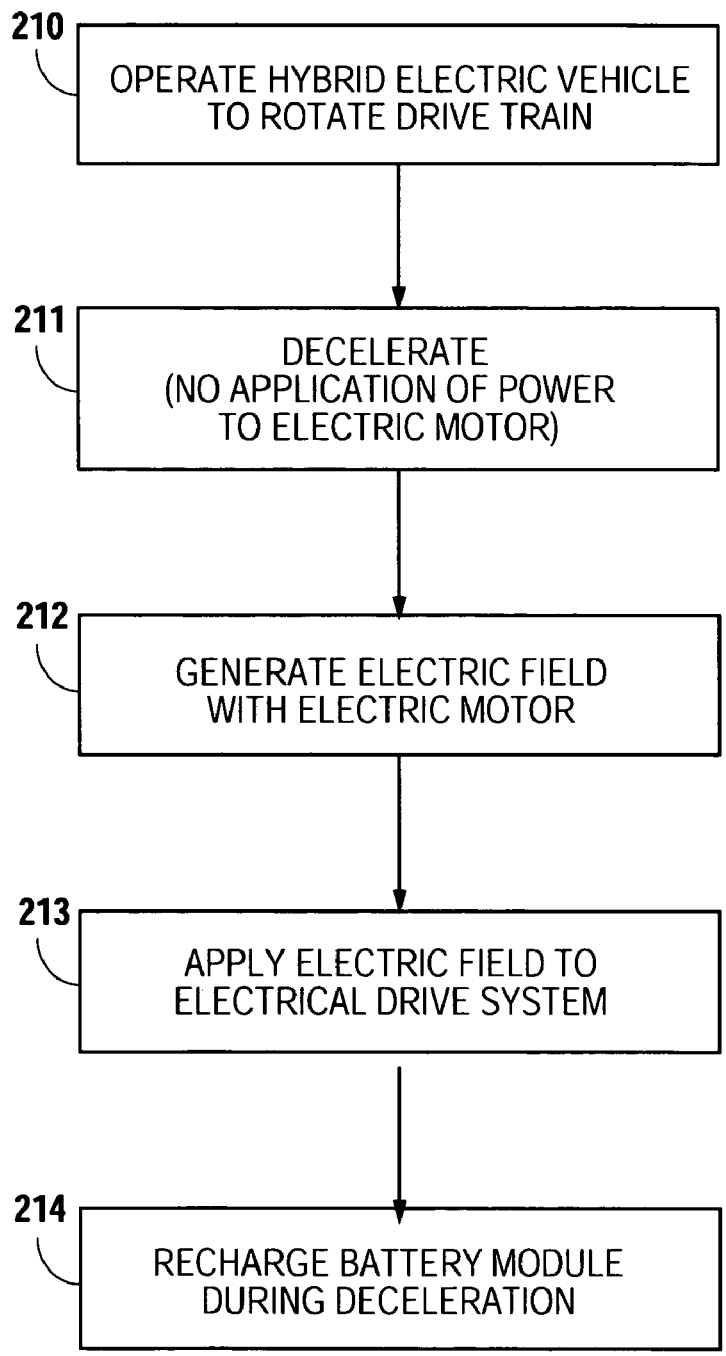
FIG. 8e provides a method flowchart illustrating the method steps of recharging the battery module with on board generators according to the preferred embodiment.

As shown in the method flowchart of FIG. 8e, an application of power to the electric motor 65 of the hybrid-electric powered vehicle 1 propels the hybrid-electric powered vehicle 1 when the ignition is in an on position. Operating a hybrid-electric powered vehicle 1 generates a rotation of the drive train, step 210. The process continues with decelerating and not applying power to the electric motor 65, step 211. Step 212 provides for generating an electric field by turning the electric motor 65. The process continues with step 213, wherein the generated electric field is applied to the battery module 3 of the electrical drive system 24B. The process continues with step 214, wherein the applied electric field recharges the battery module 3.

Figure 8F:
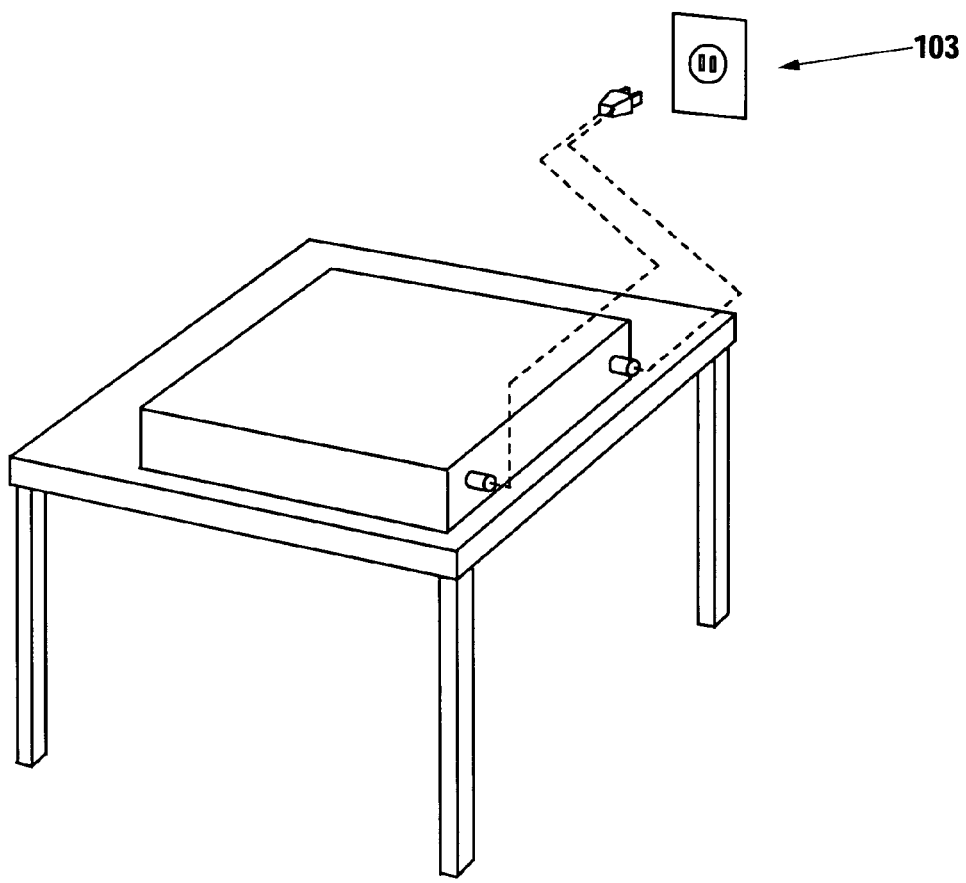
FIG. 8f a perspective view illustrating a battery module being charged while disposed outside of a battery module compartment.

Still further, the battery module 3 may be charged by an external power supply 103, as shown in FIG. 8f, when the battery module 3 is not installed into the battery module compartment 25. Charging of this type may be required when a battery module 3 is at a manufacturing facility or service facility. When removed from a hybrid-electric powered vehicle 1, a battery module 3 may be placed on a shelf or storage system for charging, repair, or storage. Facilities designed for servicing of a battery module 3 may include multiple charging bays, storage shelves, new battery products, used battery products, and the like. Charging of the battery module 3 may be accomplished utilizing conventional battery charging methods and equipment, or new methods and devices may be developed to increase charging efficiencies.

Figure 8G:
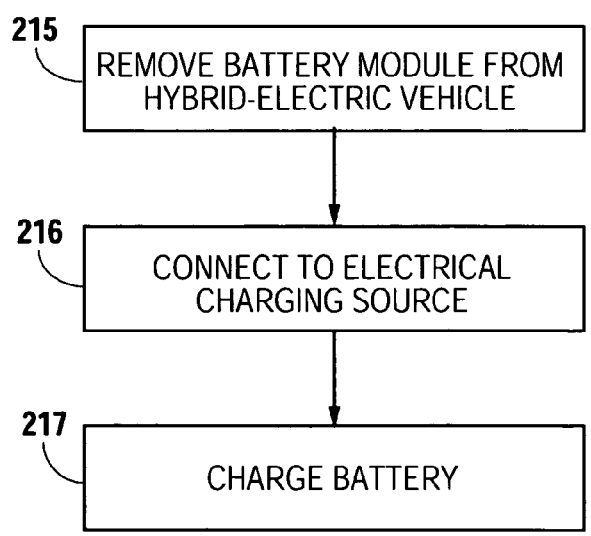
FIG. 8g provides a method flowchart describing the recharging of a battery module removed from the hybrid-electric powered vehicle.

FIG. 8g provides a method flowchart for charging a battery module 3 outside of the hybrid-electric powered vehicle 1. As shown in step 215, a deleted battery module 3 is removed from the hybrid-electric powered vehicle 1. A replacement may or may not be installed. The process continues with step 216, wherein the battery module 3 is connected to a charging source 103. The battery 4 may or may not be removed from the battery module 3 during charging services. The process continues with step 217, wherein the battery module 3 or battery is returned to a charged condition.

In this hybrid-electric powered vehicle 1, the removable battery module 3 may be recharged by multiple charging sources. As previously disclosed, the battery module 3 may receive a charging current from a generator 71 disposed on the internal combustion engine 18, one or more onboard generators during deceleration, external power sources 102 while mounted in the battery module compartment 25, and external power sources 103 when the battery module 3 is external to the battery module compartment 25.

In a second embodiment, a hybrid-electric powered vehicle 100 includes a control system having an increased capability, and at least one additional on-board electrical power source. Portions of the hybrid electric powered vehicle 100 of this second embodiment are substantially identical to the hybrid electric powered vehicle 1 of the first embodiment, and accordingly, like parts have been annotated with like numerals. The hybrid electric powered vehicle 100 includes an ignition system 24A, an electrical driving system 124B, an internal combustion driving system 24C, and a variable power transfer device 19. In this second embodiment, the ignition system 24A, and the variable power transfer device 19 are identical to the hybrid electric powered vehicle 1. The electrical driving system 124B of this second embodiment has been adapted to utilize at least one additional on board power source. Illustratively, the electrical driving system 124B is adapted to switch between the individual power sources, place the at least one additional power source in parallel with the removable battery module 3, or place the at least one additional electrical power source in series with the removable battery module 3, as required for power demands, and smooth operation.

Figure 9A:
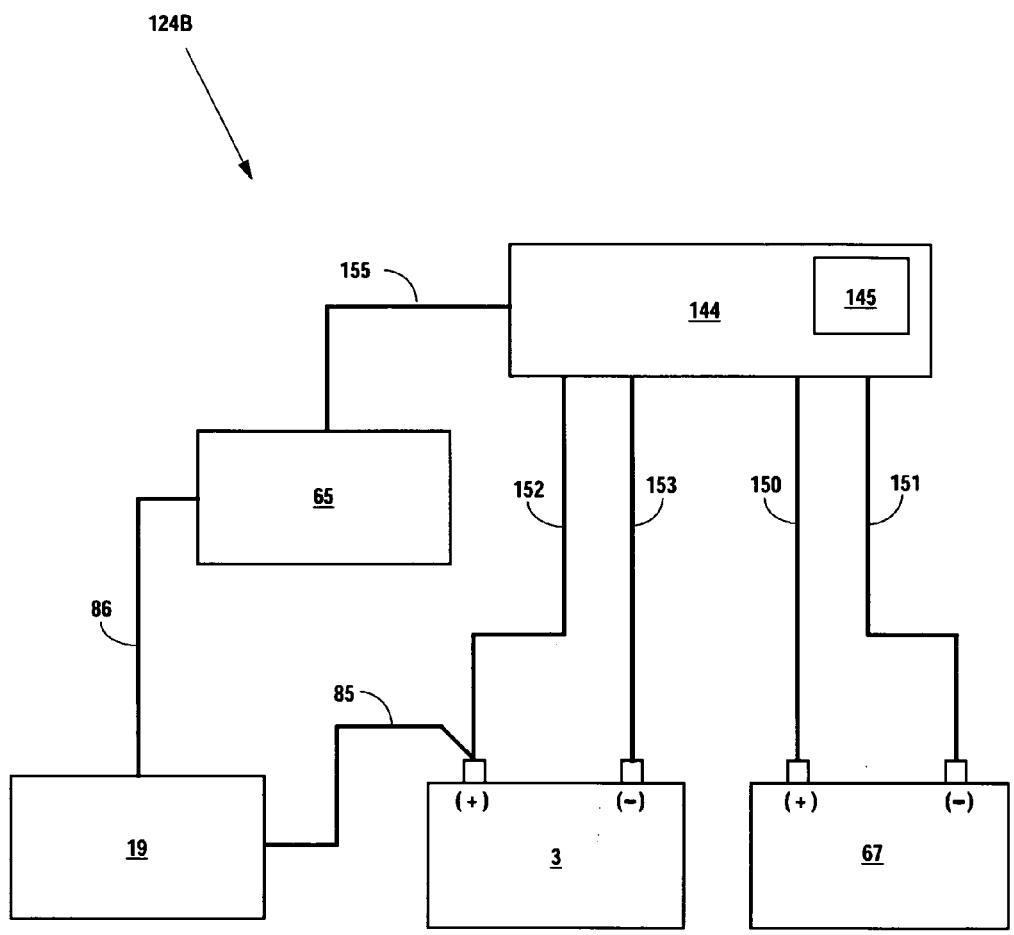
FIG. 9a provides an overview of a block diagram of a control system according to a second embodiment.
Figure 9B:
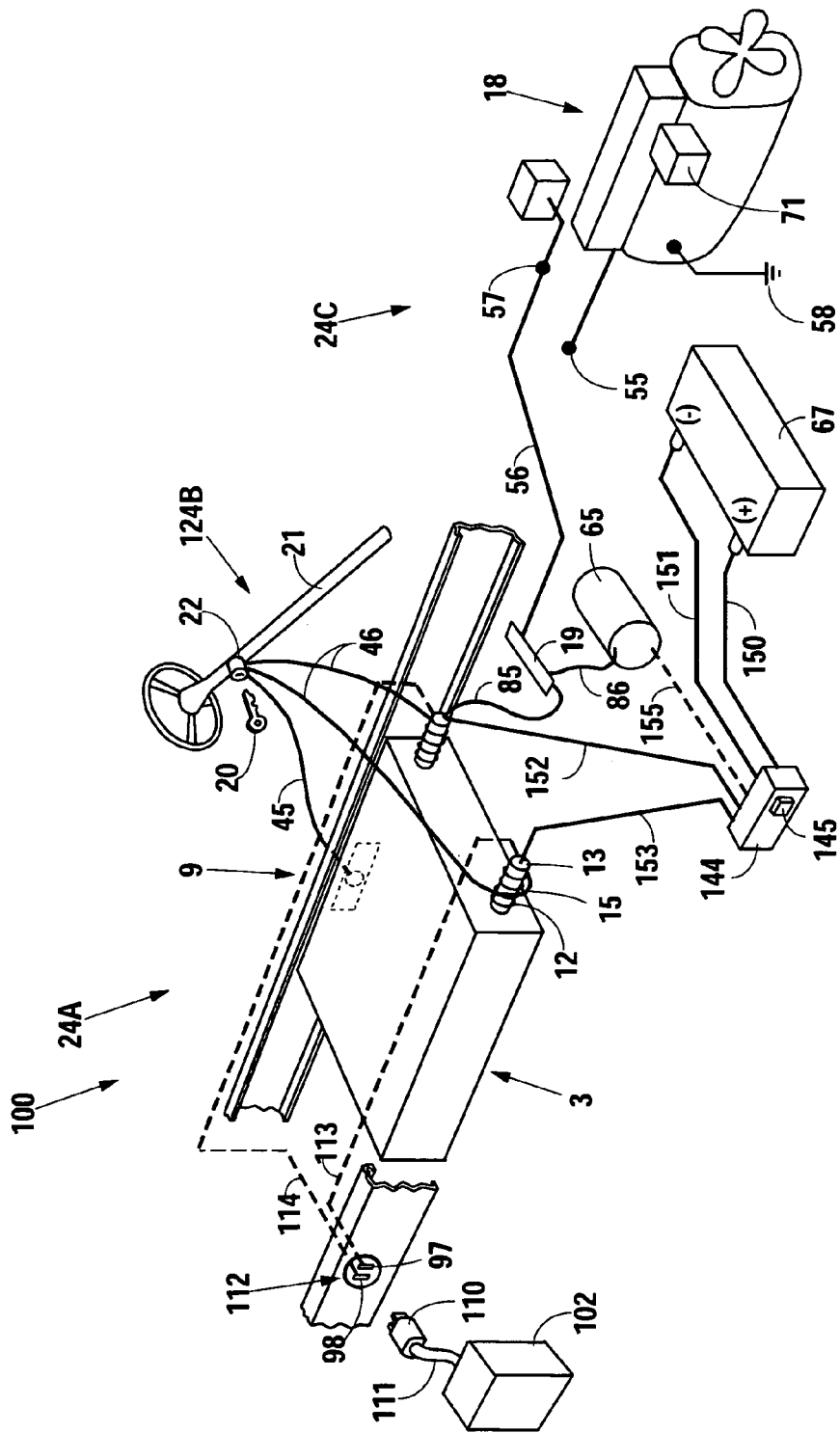
FIG. 9b illustrates a power supply system including an on-board battery compartment utilized in conjunction with the removable battery module 3 according to the second embodiment.

As shown in FIG. 9a-9b, the electrical driving system 124B includes an electric motor 65, a control system 144, an on-board battery compartment 67, and a removable battery module 3. The electric motor 65 and the removable battery module 3 are identical in form and function to the electric motor 65 and the removable battery module 3 disclosed in the first embodiment. The control system 144 is a microprocessor based control system, and includes a controller 145. The control system 144 is in electrical communication with the electric motor 65 through a motor lead 155. A lead 85 completes the electrical path from the positive terminal of the removable battery module 3 to the variable power transfer device 19, and a lead 86 completes the electrical path between variable power transfer device 19 and the electric motor 65.

The control system 144 is in electrical communication with a positive terminal of the on-board battery compartment 67 through a first lead 150, and the control system 144 is in communication with a negative terminal of the on-board battery module 67 through a second lead 151. The control system 144 is further in electrical communication with a positive terminal of the battery module 3 through a third lead 152, and the negative terminal of the battery module 3 through a fourth lead 153. The control system 144 transmits power from the battery module 3 and/or the on-board battery compartment 67 to the electric motor 65 when directed by the controller 145. The control system 144 has the capability to deliver power to the electric motor 65 from either the on-board battery compartment 67, the removable battery module 3, or both, depending on power requirements. Accordingly, the control system 144 for two power sources would include four positions for the delivery of electrical power to the electric motor 65.

In a first position, the control system 144 provides for the delivery of power from the removable battery module 3 to the electric motor 65. This phase of the electrical power distribution is substantially identical to that of the first embodiment, however, the new circuit will be described for clarity with reference to FIGS. 9a and 9b. With an ignition switch in an on position, the coils 15 are energized, and the bolt 13 is moved into a contact position to complete the power circuit. Accordingly, current may flow through the circuit defined by leads 85, 86, 155, and 153 to provide current to the electric motor 65 in increasing increments when the variable power transfer device 19 is activated. Use of only the removable battery module 3 for power extends the charged life of the on-board battery compartment 67. Further, use of only the removable battery module 3 may be required upon failure of the on-board battery compartment 67.

In a second position, the control system 144 provides for the delivery of power from the on-board battery compartment 67 to the electric motor 65. In this position, the control system 144 connects the first lead 150 to the third lead 152, and the second lead 151 to the motor lead 155. Upon completion of the circuit, current flows through the electric motor 65 when the variable power transfer device 19 is activated. Use of only the on-board battery compartment 67 extends the charged life of the removable battery module 3. Further, use of only the on-board battery compartment 67 may be critical upon a failure of the removable battery module 3, or if the removable battery module 3 has been removed for charging.

In a third position, the control system 144 places the primary battery compartment 67 in series with the removable battery module 3. As shown in FIGS. 9a-9b, the control system 144 completes electrical paths necessary to provide power to the electric motor 65. Illustratively, the motor lead 155 and the second lead 151 complete the circuit between the electric motor 65 and a negative terminal of the primary battery compartment 67. The control system 144 may further complete the electrical path between the positive terminal of the primary battery compartment 67 and the negative terminal of the removable battery module 3 by connecting the first lead 150 and the fourth lead 153. The lead 85 completes the electrical path from the positive terminal of the removable battery module 3 to the variable power transfer device 19, and the lead 86 completes the electrical path between variable power transfer device 19 and the electric motor 65. In this arrangement, electrical power is able to flow through the circuit defined by leads 85, 86,155, 151, 150, and 153. One of ordinary skill in the art will recognize that two electrical power sources in series are added to create an increased voltage and power output. An increased power requirement may be necessary during hard accelerations of hybrid-electric powered vehicle 100. Furthermore, one of ordinary skill in the art will further recognize that the use of additional power sources in this manner decreases the reliance of the hybrid-electric powered vehicle 100 on the internal combustion engine 18. Further, additional power sources may enable the manufacturers to increase the size of the electric motor 65.

In a fourth position, the control system 144 provides for placing the removable battery module 3 and the on-board battery compartment 67 in parallel, thereby increasing the current that is applied to the electric motor 65. A parallel arrangement is accomplished by connecting the first lead 150 to the third lead 152, the second lead 151 to the fourth lead 153, and the motor lead 155 to the fourth lead 153. In this configuration, the removable battery module 3 and the on-board battery compartment 67 are in parallel. A first segment of the parallel circuit containing the removable battery module 3 is defined by leads 85, 86 155, and 153. A second segment of the parallel circuit is defined by the leads 85, 86, 155, 151, 150, and 152. In this arrangement, electrical power is able to flow from both of power sources 3 and 67 when the variable power transfer device 19 is actuated. Use of both the removable battery module 3 and the on-board battery compartment 67 in a parallel arrangement provides the capability to extend a charge life of both the removable battery module 3 and the on-board battery compartment 67.

With the capability to move between the four possible positions, the control system 144 is able to meet power demands more efficiently, and is further able to conserve energy when electrical power demands are low. The control system 144 further includes the capability to switch to the internal combustion driving system 24C as required for an alternate power source.

The internal combustion driving system 24C includes an internal combustion engine 18 and a generator 71. The internal combustion engine 18 is readily known in the art, and comprises a motor, an electrical power input 55 disposed on the motor, a grounding connection 58, and an accelerator input 57 for accepting an accelerator linkage 56. In this detailed example, the internal combustion engine 18 is fueled by gasoline, however, one of ordinary skill in the art will recognize that alternative fuels may be utilized, such as natural gas, propane, and the like. Fuel regulation and mixture controls may be accomplished using off the shelf carburetors or fuel injection systems. The application of the fuel to the internal combustion engine 18 may be directed by an operator through the use of the accelerator input 57, typically a ball joint mounted on a throttle plate. An accelerator linkage 56 may be connected to the ball joint and a power input device, such as a foot-activated accelerator in a passenger compartment of a vehicle. In this detailed example, the power distribution control 19 may be shared by both the electrical driving system 124B and the internal combustion driving system 24C. The electrical input 55 is electrically connected to the ignition switch 22, such that the internal combustion engine 18 receives power for operation from the removable battery module 3 or from the primary battery compartment 67 when the ignition switch 22 is in an on position. The generator 71 is coupled to the internal combustion engine 18, and may deliver power to the removable battery module 3, or the primary battery compartment 67 when the internal combustion engine 18 is operating.

In operation, a vehicle operator places the key 20 into the ignition switch 22 and moves the ignition switch 22 to an on position that provides power from the battery 4 to the ignition system 24A. As a result, the coils 15 energize, thereby drawing a respective bolt into a respective cylindrical cavity 40A-D to lock the battery module 3 within the chassis 5 or 50. Furthermore, the bolts 13 associated with the electrical driving system 124B engage a respective power contact 42A and B to electrically connect the battery module 3 and the primary battery compartment 67 with the control system 144, and ultimately, with the electric motor 65 circuit. In the on position, the power transfer device 19 and the electric motor 65 await a power source. Completion of the circuit utilizing one of the four positions permits the application of power to the motor 65 when the accelerator is activated. Thus, engaging the variable power transfer device 19 (i.e., stepping on the accelerator pedal) furnishes power in increasing levels to the electric motor 65, and/or the internal combustion engine 18, causing movement of the hybrid-electric powered vehicle 100.

Figure 9C:
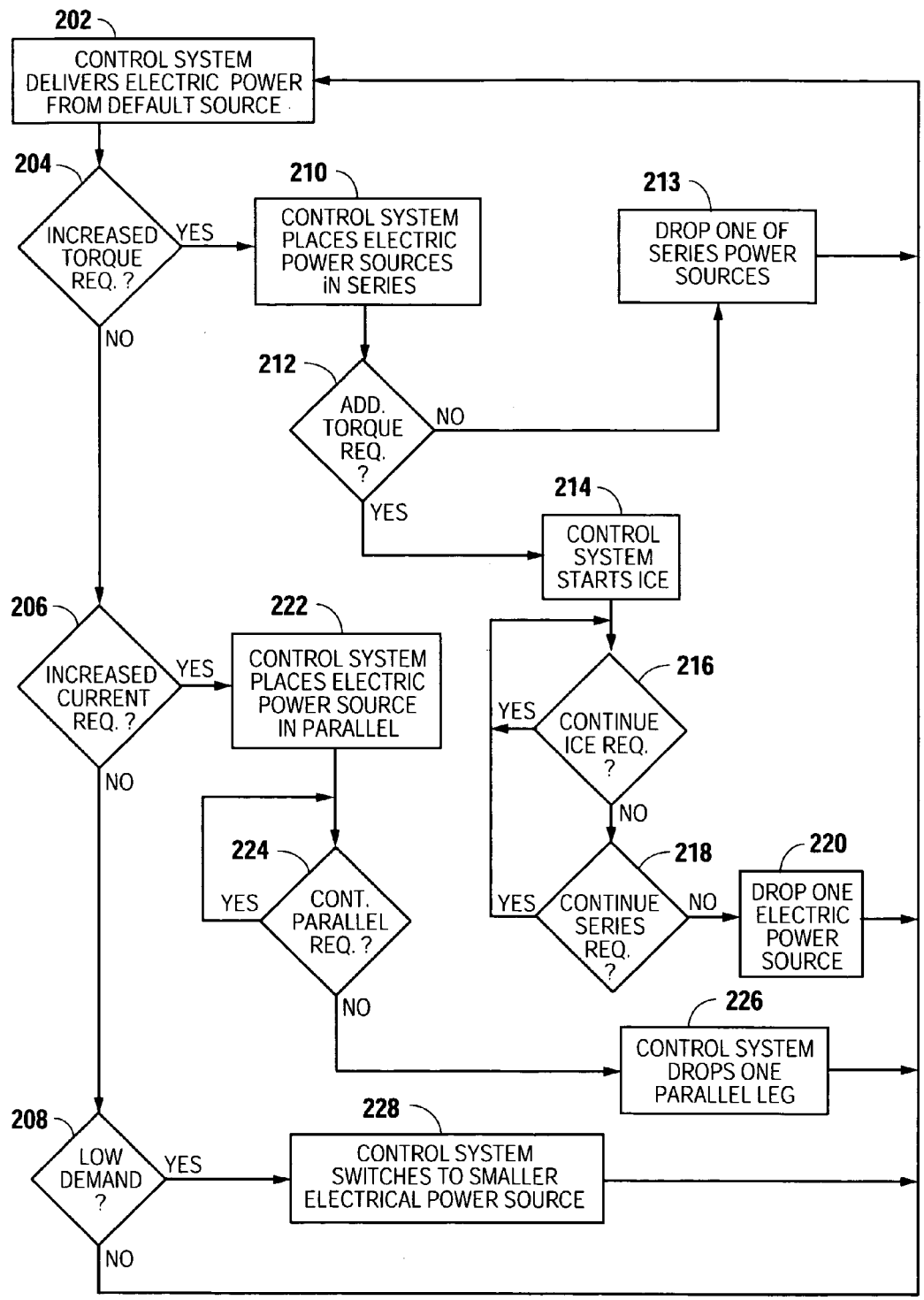
FIG. 9c provides a method flowchart illustrating the steps of the control system in use according to the second embodiment.

FIG. 9c provides a method flowchart illustrating the control system 144 in use. The process commences with step 202, wherein the control system 144 provides for the delivery of electrical power to the electric motor 65 from a default source. Illustratively, the default electrical power source could be a largest power source available. The controller 145 then determines if there is an increased torque requirement, as shown in step 204. If an increased torque requirement exists, the process moves to step 210, wherein the control system 144 places the removable battery module 3 and the on board battery compartment 67 in series. The positioning of the electrical power sources in series provides an increased torque to meet the demand. The controller 145 then moves to step 212 to determine if additional torque requirements exist. If the additional torque requirements do not still exist, the controller 145 moves to step 213, wherein the control system 144 drops one of the electrical power sources. If additional torque requirements still exist, the controller 145 may commence the internal combustion engine 18 for the delivery of additional torque from the internal combustion engine 18, as shown instep 214. After commencing the internal combustion engine 18, the controller 145 moves to step 216 to ascertain whether there is a continued internal combustion engine 18 requirement. If a continued internal combustion engine 18 torque demand still exists, the controller 145 returns to just before step 216 to recheck for a continued demand. If a continued internal combustion engine 18 demand does not exist in step 216, the controller 145 moves to step 218 to determine if a continued series demand exists. If the series demand does still exist in step 218, the controller 145 returns to the process just before step 216. If the series demand does not exist in step 218, the controller 145 moves to step 220, wherein the controller 145 drops one of the electrical power sources. After dropping one of the electrical power sources in step 220, the controller 145 returns to step 202 to recommence the routine.

If an increased torque requirement is not required in step 204, the controller 145 moves to step 206, wherein the controller 145 determines if there is an increased current requirement. If there is an increased current requirement in step 206, the controller 145 moves to step 222, and places the two electrical power sources in parallel to create an increased current capability. The controller 145 the moves to step 224 to ascertain if a continued parallel requirement is required. If a continued parallel requirement exists in step 224, the controller 145 returns to a point between the steps 222 and 224 to recheck the parallel requirement. If a continued parallel requirement does not exist in step 224, the controller moves to step 226, wherein the controller 145 drops one of the parallel circuit legs, and returns to step 202 to recommence the routine.

If an increased current requirement does not exist in step 206, the controller 145 moves to step 208 to determine if a low torque demand exists. If a low torque demand does exist in step 208, the controller 145 moves to step 228, wherein the controller 145 moves from the larger power source to the smaller power source. If a low demand is not experienced in step 208, the controller 145 returns to step 202 to recommence the cycle.

When a vehicle operator uses the key 20 to move the ignition switch 22 to an off position, the coils 15 de-energize, resulting in the natural magnets drawing a respective bolt into a respective cylindrical cavity 32A and B and 38C and D, thereby unlocking the battery module 3. Further, the primary battery compartment 67 is electrically isolated from the electric motor 65. The hybrid-electric vehicle 100 of this second embodiment de-energizes the coils and breaks the circuit to isolate the battery 4, thereby providing maximum conservation of the battery 4. The internal combustion engine 18 is also disabled when the ignition switch 22 is in the off position, thereby ceasing the generation of power by the generator 71.

All other aspects of the hybrid electric powered vehicle 100 are identical to the hybrid-electric vehicle 1 of the first embodiment. In this hybrid-electric powered vehicle 100, the removable battery module 3 may be recharged by multiple charging sources, as disclosed in the first embodiment of this disclosure. Illustratively, the battery module 3 may receive a charging current from a generator 71 disposed on the internal combustion engine 18, one or more onboard generators during deceleration, external power sources 102 while mounted in the battery module compartment 25, and external power sources 103 when the battery module 3 is external to the battery module compartment 25. The on-board battery compartment 67 may also receive charging from the aforementioned sources, including the generator 71 during operation of the internal combustion engine 18, the on-board generators, and external power sources 102 and 103.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope accordingly, is not to be limited in any respect by the foregoing description; rather, it is defined only by the claims that follow.

I claim:

1. A hybrid-electric powered vehicle, comprising:
   a chassis defining a battery module compartment, the chassis supporting an internal combustion engine and an electric motor; and
   a battery module insertable into the battery module compartment of the chassis, whereby the battery module completes the chassis upon insertion into the battery module compartment, thereby providing the chassis with required structural integrity necessary to support the hybrid-electric powered vehicle during travel, and further whereby the battery module powers the electric motor to cause movement of the hybrid-electric powered vehicle.

2. The hybrid-electric powered vehicle according to claim 1, further comprising a locking assembly for locking the battery module within the battery module compartment of the chassis.

3. The hybrid-electric powered vehicle according to claim 1, wherein the battery module comprises:
   a battery tray including an ignition contact to provide an electrical connection between the battery tray and an ignition system of the electric powered vehicle; and
   a battery insertable into the battery tray, wherein the battery includes an ignition contact to provide an electrical connection between the battery and the battery tray.

4. The hybrid-electric powered vehicle according to claim 1, further comprising an access door coupled to the chassis, wherein the access door pivots from a closed position over the battery module compartment to an open position exposing the battery module compartment.

5. The hybrid-electric powered vehicle according to claim 1, wherein the chassis comprises a chassis front and a chassis rear.

6. The hybrid-electric powered vehicle according to claim 1, further comprising:
   a controller disposed on the chassis, wherein the controller regulates the operations of the electric motor and the internal combustion engine.

7. The hybrid-electric powered vehicle according to claim 1, wherein the battery module is recharged by external power sources while the battery module remains in the battery compartment.

8. The hybrid-electric powered vehicle according to claim 1, wherein the battery module may be recharged outside of the hybrid-electric powered vehicle.

9. The hybrid-electric powered vehicle according to claim 1, wherein the battery module is recharged by the electric motor during deceleration.

10. The hybrid-electric powered vehicle according to claim 1, further comprising:
an on-board battery compartment.

11. The hybrid-electric powered vehicle according to claim 1, wherein the on-board battery compartment is recharged by the electric motor during deceleration.

12. The hybrid-electric powered vehicle according to claim 2, wherein the locking assembly comprises:
a bolt residing within a cavity in the chassis;
a biasing member for biasing the bolt to an unlocked position; and
an electromagnetic field generator for generating an electromagnetic field that draws the bolt to a locked position within a cavity in the battery module.

13. The hybrid-electric powered vehicle according to claim 12, wherein the locking assembly further comprises a power contact engaged by the bolt in its locked position to provide an electrical connection among a battery of the battery module, the bolt, and an electric motor of the hybrid-electric powered vehicle.

14. The hybrid-electric powered vehicle according to claim 12, wherein the locking assembly further comprises an ignition contact engaged by the electromagnetic field generator to provide an electrical connection among a battery of the battery module, the electromagnetic field generator, and an ignition system of the electric powered vehicle.

15. The hybrid-electric powered vehicle according to claim 12, wherein the biasing member comprises a natural magnet.

16. The hybrid-electric powered vehicle according to claim 12, wherein the biasing member comprises a spring.

17. The hybrid-electric powered vehicle according to claim 12, wherein the electromagnetic field generator comprises a coil.

18. The hybrid-electric powered vehicle according to claim 5, wherein the chassis front comprises a cross-member defining a front portion of the battery module compartment.

19. The hybrid-electric powered vehicle according to claim 5, wherein the chassis rear comprises a cross-member defining a rear portion of the battery module compartment.

20. The hybrid-electric powered vehicle according to claim 5, wherein the chassis further comprises a support member attached between the chassis front and the chassis rear.

21. The hybrid-electric powered vehicle according to claim 5, wherein the chassis front, the chassis rear, and a body of the electric vehicle are formed integrally in a unibody construction.

22. The hybrid-electric powered vehicle according to claim 18, further comprising a chassis contact attached to the cross-member to provide an electrical connection between a battery of the battery module and an ignition system of the hybrid-electric powered vehicle.

23. The hybrid-electric powered vehicle according to claim 20, wherein the support member defines a side portion of the battery module compartment.

24. The hybrid-electric powered vehicle according to claim 20, further comprising a chassis contact attached to the support member to provide an electrical connection between a battery of the battery module and an ignition system of the hybrid-electric powered vehicle.

25. The hybrid-electric powered vehicle according to claim 21, wherein a section of the body spanning the chassis front and the chassis rear defines a side portion of the battery module compartment.

26. The hybrid-electric powered vehicle according to claim 25, further comprising a chassis contact attached to the section of the body spanning the chassis front and the chassis rear to provide an electrical connection between a battery of the battery module and an ignition system of the hybrid-electric powered vehicle.

27. The hybrid-electric powered vehicle according to claim 7, wherein the battery module is charged by on-board power sources.

28. The hybrid-electric powered vehicle according to claim 27, wherein the on-board charging device is a solar power supply.

29. The hybrid-electric powered vehicle according to claim 10, further comprising:
a control system in electrical communication with the battery module and the on-board battery compartment, wherein the control system regulates the distribution of power from the on-board battery compartment and the battery module, and further wherein the control system connects the on-board battery compartment and the battery module in series to deliver an increased power level to the electric motor, thereby propelling the vehicle.

30. The hybrid-electric powered vehicle according to claim 10, wherein the on-board battery compartment is recharged by external power sources while the battery module remains in the battery compartment.

31. The hybrid-electric powered vehicle according to claim 10, wherein the on-board battery compartment is charged by on-board power sources.

32. The hybrid-electric powered vehicle according to claim 29, wherein the control system connects the on-board battery compartment and the battery module in parallel to provide an increased current level to the electric motor, thereby propelling the vehicle.

33. The hybrid electric powered vehicle according to claim 29, wherein the control system utilizes the on-board battery compartment to deliver electrical power to the electric motor, thereby propelling the vehicle.

34. The hybrid-electric powered vehicle according to claim 29, wherein the control system further comprises a controller to regulate the operations of the control system and the hybrid-electric powered vehicle.

35. The hybrid-electric powered vehicle according to claim 31, wherein the on-board charging device is a solar power supply.

36. A method of creating an increased power output in a hybrid-electric powered vehicle, comprising:
a. operating a hybrid-electric powered vehicle with a first electrical power source, wherein the hybrid-electric vehicle includes the first electric power source, a second electric power source, and a drive system; and
b. placing the second electrical power source in series with the first electrical power source to deliver an increased power output to the drive system.

37. The method of creating an increased power output according to claim 36, further comprising:
c. removing the second electrical power source from the series loop to return to being powered by the first electrical power source.

38. The method of creating an increased power output in a hybrid-electric powered vehicle according to claim 36, wherein step b. is replaced with:
b. placing the second electrical power source in parallel with the first electrical power source to deliver an increased current to the drive system.

c. removing the second electrical power source from the parallel loop to return to being powered by the first electrical power source.

39. The method of claim 36, wherein step b. is replaced with:
b. switching from the first electrical power source to the second electrical power source to conserve electrical power.

40. The method of claim 39, wherein step b. is replaced with:
b. switching from the second electrical power source to the first electrical power source to compensate for an increased loading on the hybrid-electric powered vehicle.

* * * * *